US012299136B2

(12) United States Patent
Navarro-Dimm et al.

(10) Patent No.: US 12,299,136 B2
(45) Date of Patent: May 13, 2025

(54) AUTOMATED SOFTWARE CODE VALIDATION AND DEPLOYMENT

(71) Applicant: AT&T Intellectual Property I, L.P., Atlanta, GA (US)

(72) Inventors: Jason Navarro-Dimm, Cumming, GA (US); Anthony Fleck, Hurst, TX (US); Brenda Pratt, Wylie, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 177 days.

(21) Appl. No.: 17/960,908

(22) Filed: Oct. 6, 2022

(65) Prior Publication Data
US 2024/0119159 A1    Apr. 11, 2024

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
None
See application file for complete search history.

(56) References Cited

U.S. PATENT DOCUMENTS

| 11,086,757 | B1 * | 8/2021 | Ciliberti | G06F 11/366 |
| 11,736,585 | B2 * | 8/2023 | Perng | H04L 67/133 |
| | | | | 709/227 |
| 11,977,476 | B2 * | 5/2024 | Bansal | H04L 63/1433 |
| 2023/0229413 | A1 * | 7/2023 | Basu | G06F 8/71 |
| | | | | 717/168 |
| 2023/0394159 | A1 * | 12/2023 | Misra | G06F 21/577 |

\* cited by examiner

*Primary Examiner* — Jeffrey R Swearingen
(74) *Attorney, Agent, or Firm* — Hartman & Citrin LLC

(57) ABSTRACT

Automated software code validation and deployment can include obtaining software code. The software code can be created via interactions with a computing device. In response to obtaining the software code and prior to receiving a request to deploy the software code, a security scan can be performed on the software code. After performing the security scan on the software code, a request to deploy the software code can be detected and in response to detecting the request, it can be determined if the software code includes a vulnerability that was detected during the security scan. If a determination is made that the software code does not include the vulnerability, the software code can be deployed. If a determination is made that the software code includes the vulnerability, deployment of the software code can be terminated, a security scan report can be generated, and the security scan report can be output.

20 Claims, 7 Drawing Sheets

AUTOMATED SOFTWARE CODE VALIDATION AND DEPLOYMENT

BACKGROUND

With the proliferation of software applications to support interactions in an increasingly diverse set of environments, the effects of software flaws such as security vulnerabilities are seen in an increasing number of computing environments. To address the increasing number of software flaws, applications may be scanned and/or monitored after deployment to recognize flaws in the execution and/or performance of the applications.

Correcting software flaws, however, can be costly. Namely, the correction of software flaws may require deactivating execution of the application while a patch is created and deployed, thereby affecting customer experience negatively. Furthermore, deploying patches can be costly in terms of development costs, network costs, customer service issues associated with the patches, and the like. Furthermore, ensuring that all users obtain and install the patches can be difficult and costly for software developers.

SUMMARY

The present disclosure is directed to automated software code validation and deployment. As used herein, the term "automated" with regard to a security scan can be used to refer to the security scan occurring in response to detecting receipt of the software code or detecting a change to the software code and/or the security scan occurring without any request for a security scan of the software code by a user or other entity. Software code can be obtained by a device such as a server computer. The server computer can obtain the software code, for example from one or more libraries and/or via interactions with a development application, which can be executed by the server computer and/or by other devices such as a computing device.

Prior to any user or author requesting deployment of the software code (e.g., as an application), the server computer can, via execution of a security scan engine, perform a security scan of the software code to search for vulnerabilities such as security vulnerabilities, privacy vulnerabilities, stability flaws, and/or other errors in the software code that can affect the performance and/or security of an application based on the software code. According to various embodiments of the concepts and technologies disclosed herein, the security scan is performed only to identify security vulnerabilities in the software code. In some embodiments, the security scan engine can perform the security scan on the software code and/or the security scan engine can invoke one or more scanners provided by one or more scan providers. Thus, it can be appreciated that the scan providers can provide scanning security scan capability for the security scan engine in some embodiments as applets, plugins, or the like. It should be understood that this example is illustrative, and therefore should not be construed as being limiting in any way.

At some point after obtaining the software code and performing one or more security scans on the software code, the security scan engine (or other module or application at the server computer) can detect a request to deploy the software code and/or an application based on the software code. Upon detecting the request to deploy the software code the security scan engine can determine if the software code includes any vulnerabilities. In some embodiments the determination can include identifying vulnerabilities and an associated threat level and/or threat severity such as low, medium, high, critical, etc. If any vulnerabilities are detected, or any vulnerabilities of a specified threat level (e.g., low, medium, high, critical, etc.) are detected, the security scan engine can terminate deployment of the software code, generate a security scan report that identifies detected vulnerabilities and their associated threat levels, and output the security scan report (e.g., send the security scan report to a device or entity associated with software code such as the author at a computing device, a manager at a manager device, or other entity). In some embodiments, an authorized entity such as a manager device can be requested or otherwise given the opportunity to generate an override for any vulnerabilities detected in the software code. If no vulnerabilities are detected, or if any vulnerabilities detected are under a specified threat level (e.g., only low threat vulnerabilities; only low and/or medium threat vulnerabilities; only low, medium, and/or high; or the like) are detected, the security scan engine can initiate or trigger the initiation of deployment of the software code and/or take other actions.

In some embodiments, the security scan engine can be configured, in a case where deployment has been paused or terminated, to monitor changes to the software code. If changes are detected, the security scan engine can perform another security scan of the software code to determine if any vulnerabilities have been remediated and/or if any other vulnerabilities exist in the software code. If another request to deploy the software code is detected, the security scan engine can again determine if the software code is to be deployed. This process can be iterated until the security scan engine determines that either no vulnerabilities exist in the software code, that no vulnerabilities above a specified threat level exist in the software code, and/or that any vulnerabilities above a specified threat level have been exempted by an authorized entity by way of an override. It should be understood that this example is illustrative, and therefore should not be construed as being limiting in any way.

The security scan engine can deploy, or trigger other devices or entities such as the deployment engine to deploy the software code and/or an application based on the software code. According to various embodiments of the concepts and technologies disclosed herein, the software code can be compiled, used to build object code, and/or otherwise used to generate a deployable version of the software code (e.g., as the application). The deployment engine can identify one or more resources that will host the application such as, for example, the application server, a virtual machine and/or data storage resource (e.g., in a cloud computing environment such as a data center, or the like). The deployment engine also can coordinate the deployment of the application to the identified resource(s), for example by invoking or triggering other devices or entities (e.g., an orchestrator or the like) to instantiate resources and/or deploy the application. It should be understood that these examples are illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining software code. The software code can be created via interactions with a computing device. The operations also can include in response to obtaining the software code and prior to receiving a request to deploy the software code, performing a security scan on the software code; detecting, after performing the security scan on the software code, the request to deploy the software code; in response to detecting the request to deploy the software code, determining if the software code includes a vulnerability that was detected during the security scan; and if a determination is made that the software code does not include the vulnerability, deploying the software code. The software code can be deployed to an application server. The operations also can include terminating deployment of the software code, generating a security scan report, and outputting the security scan report to the computing device if a determination is made that the software code does include the vulnerability.

In some embodiments, the computing device can execute a development application that can be used to generate the software code, and the software code can be obtained via a portal and from the computing device. In some embodiments, the vulnerability can include a security vulnerability that can exceed a defined threshold threat level, and determining that the software code does not include the vulnerability can include determining that any vulnerabilities detected in the software code do not exceed the defined threshold threat level.

In some embodiments, the security scan can be performed by a security scan engine and a scan provider in communication with the security scan engine. In some embodiments, operations further can include detecting a change to the software code; in response to detecting the change to the software code and prior to receiving a further request to deploy the software code, determining that the vulnerability has been remediated; detecting, after determining that the vulnerability has been remediated, the request to deploy the software code; and deploying the software code. In some embodiments, operations further can include obtaining, from a manager device, an override that requests deployment of the software code; and in response to obtaining the override, deploying the software code. In some embodiments, deploying the software code can include identifying the application server and triggering instantiation of the application server.

According to another aspect of the concepts and technologies disclosed herein, a method is disclosed. The method can include obtaining, by a server computer that can include a processor, software code. The software code can be created via interactions with a computing device. The method also can include in response to obtaining the software code and prior to receiving a request to deploy the software code, performing, by the processor, a security scan on the software code. The method also can include detecting, by the processor and after performing the security scan on the software code, the request to deploy the software code; in response to detecting the request to deploy the software code, determining, by the processor, if the software code includes a vulnerability that was detected during the security scan; and if a determination is made that the software code does not include the vulnerability, deploying, by the processor, the software code. The software code can be deployed to an application server. The method also can include if a determination is made that the software code does include the vulnerability, terminating deployment of the software code, generating a security scan report, and outputting the security scan report to the computing device.

In some embodiments, the computing device can execute a development application that can be used to generate the software code, and the software code can be obtained via a portal and from the computing device. In some embodiments, the vulnerability can include a security vulnerability that can exceed a defined threshold threat level, and determining that the software code does not include the vulnerability can include determining that any vulnerabilities detected in the software code do not exceed the defined threshold threat level.

In some embodiments, the security scan can be performed by a security scan engine and a scan provider in communication with the security scan engine. In some embodiments, the method further can include detecting a change to the software code; in response to detecting the change to the software code and prior to receiving a further request to deploy the software code, determining that the vulnerability has been remediated; detecting, after determining that the vulnerability has been remediated, the request to deploy the software code; and deploying the software code. In some embodiments, method further can include obtaining, from a manager device, an override that requests deployment of the software code; and in response to obtaining the override, deploying the software code. In some embodiments, deploying the software code can include identifying the application server and triggering instantiation of the application server.

According to yet another aspect of the concepts and technologies disclosed herein, a computer storage medium is disclosed. The computer storage medium can store computer-executable instructions that, when executed by a processor, cause the processor to perform operations. The operations can include obtaining software code. The software code can be created via interactions with a computing device. The operations also can include in response to obtaining the software code and prior to receiving a request to deploy the software code, performing a security scan on the software code; detecting, after performing the security scan on the software code, the request to deploy the software code; in response to detecting the request to deploy the software code, determining if the software code includes a vulnerability that was detected during the security scan; and if a determination is made that the software code does not include the vulnerability, deploying the software code. The software code can be deployed to an application server. The operations also can include terminating deployment of the software code, generating a security scan report, and outputting the security scan report to the computing device, if a determination is made that the software code does include the vulnerability.

In some embodiments, the computing device can execute a development application that can be used to generate the software code, and the software code can be obtained via a portal and from the computing device. In some embodiments, the vulnerability can include a security vulnerability that can exceed a defined threshold threat level, and determining that the software code does not include the vulnerability can include determining that any vulnerabilities detected in the software code do not exceed the defined threshold threat level.

In some embodiments, the security scan can be performed by a security scan engine and a scan provider in communication with the security scan engine. In some embodiments, operations further can include detecting a change to the software code; in response to detecting the change to the software code and prior to receiving a further request to deploy the software code, determining that the vulnerability has been remediated; detecting, after determining that the vulnerability has been remediated, the request to deploy the software code; and deploying the software code. In some embodiments, operations further can include obtaining, from a manager device, an override that requests deployment of the software code; and in response to obtaining the override, deploying the software code. In some embodiments, deploying the software code can include identifying the application server and triggering instantiation of the application server.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIGS. 4A-4B illustrate example security scan reports, according to some illustrative embodiments of the concepts and technologies disclosed herein.

DETAILED DESCRIPTION

Figure 1:
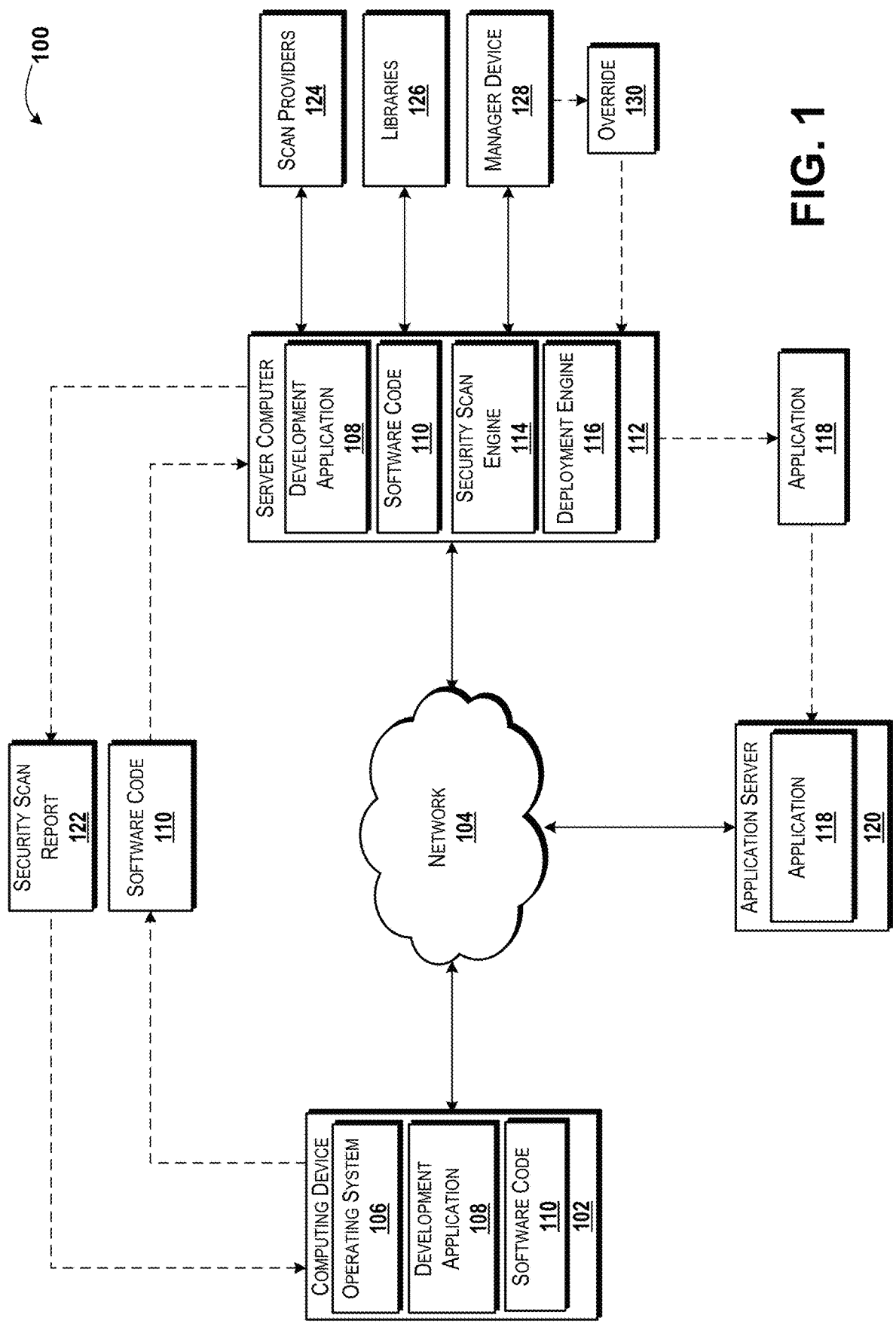
FIG. 1 is a system diagram illustrating an illustrative operating environment for various embodiments of the concepts and technologies described herein.

The following detailed description is directed to automated software code validation and deployment. Software code can be obtained by a device such as a server computer. The server computer can obtain the software code, for example from one or more libraries and/or via interactions with a development application, which can be executed by the server computer and/or by other devices such as a computing device. Prior to any user or author requesting deployment of the software code (e.g., as an application), the server computer can, via execution of a security scan engine, perform a security scan of the software code to search for vulnerabilities such as security vulnerabilities, privacy vulnerabilities, stability flaws, and/or other errors in the software code that can affect the performance and/or security of an application based on the software code. According to various embodiments of the concepts and technologies disclosed herein, the security scan is performed only to identify security vulnerabilities in the software code. In some embodiments, the security scan engine can perform the security scan on the software code and/or the security scan engine can invoke one or more scanners provided by one or more scan providers. Thus, it can be appreciated that the scan providers can provide scanning security scan capability for the security scan engine in some embodiments as applets, plugins, or the like. It should be understood that this example is illustrative, and therefore should not be construed as being limiting in any way.

At some point after obtaining the software code and performing one or more security scans on the software code, the security scan engine (or other module or application at the server computer) can detect a request to deploy the software code and/or an application based on the software code. Upon detecting the request to deploy the software code the security scan engine can determine if the software code includes any vulnerabilities. In some embodiments the determination can include identifying vulnerabilities and an associated threat level and/or threat severity such as low, medium, high, critical, etc. If any vulnerabilities are detected, or any vulnerabilities of a specified threat level (e.g., low, medium, high, critical, etc.) are detected, the security scan engine can terminate deployment of the software code, generate a security scan report that identifies detected vulnerabilities and their associated threat levels, and output the security scan report (e.g., send the security scan report to a device or entity associated with software code such as the author at a computing device, a manager at a manager device, or other entity). In some embodiments, an authorized entity such as a manager device can be requested or otherwise given the opportunity to generate an override for any vulnerabilities detected in the software code. If no vulnerabilities are detected, or if any vulnerabilities detected are under a specified threat level (e.g., only low threat vulnerabilities; only low and/or medium threat vulnerabilities; only low, medium, and/or high; or the like) are detected, the security scan engine can initiate or trigger the initiation of deployment of the software code and/or take other actions.

In some embodiments, the security scan engine can be configured, in a case where deployment has been paused or terminated, to monitor changes to the software code. If changes are detected, the security scan engine can perform another security scan of the software code to determine if any vulnerabilities have been remediated and/or if any other vulnerabilities exist in the software code. If another request to deploy the software code is detected, the security scan engine can again determine if the software code is to be deployed. This process can be iterated until the security scan engine determines that either no vulnerabilities exist in the software code, that no vulnerabilities above a specified threat level exist in the software code, and/or that any vulnerabilities above a specified threat level have been exempted by an authorized entity by way of an override. It should be understood that this example is illustrative, and therefore should not be construed as being limiting in any way.

The security scan engine can deploy, or trigger other devices or entities such as the deployment engine to deploy the software code and/or an application based on the software code. According to various embodiments of the concepts and technologies disclosed herein, the software code can be compiled, used to build object code, and/or otherwise used to generate a deployable version of the software code (e.g., as the application). The deployment engine can identify one or more resources that will host the application such as, for example, the application server, a virtual machine and/or data storage resource (e.g., in a cloud computing environment such as a data center, or the like). The deployment engine also can coordinate the deployment of the application to the identified resource(s), for example by invoking or triggering other devices or entities (e.g., an orchestrator or the like) to instantiate resources and/or deploy the application. It should be understood that these examples are illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for automated software code validation and deployment will be described, according to an illustrative embodiment. The operating environment 100 shown in FIG. 1 includes a computing device 102. The computing device 102 can operate in communication with and/or as part of a communications network ("network") 104, though this is not necessarily the case in all embodiments.

According to various embodiments, the functionality of the computing device 102 may be provided by one or more desktop computers, laptop computers, tablet computers, other computing systems, and the like. It should be understood that the functionality of the computing device 102 may be provided by a single device, by two or more similar devices, and/or by two or more dissimilar devices. For purposes of describing the concepts and technologies disclosed herein, the computing device 102 is described herein as a personal computer. It should be understood that this embodiment is illustrative, and should not be construed as being limiting in any way.

The computing device 102 can execute an operating system 106 and one or more application programs such as, for example, a development application 108. The operating system 106 can include a computer program that can control the operation of the computing device 102. The development application 108 can include an executable program that can be configured to execute on top of the operating system 106 to provide various functions as illustrated and described herein.

In particular, the development application 108 can be configured to provide functionality for enabling software code development for a user of the computing device 102. In some embodiments of the concepts and technologies disclosed herein the development application 108 can be used to generate and/or store software code 110 at the computing device 102. In some other embodiments of the concepts and technologies disclosed herein, the functionality of the development application 108 can be provided by a web browser, a terminal application, or the like; and the software code can be created at another device in communication with the computing device 102 via interactions with the other device via the network 104.

In some embodiments, for example, a server computer 112 can host the development application 108 and the computing device 102 can interact with the development application 108 via the network 104 using an application program such as a web browser, or the like. The use of various computing devices to generate software code 110 is generally understood, and the concepts and technologies disclosed herein can be used for software code 110 generated at various locations and/or various technologies, it should be understood that these examples are illustrative, and therefore should not be construed as being limiting in any way.

According to various embodiments of the concepts and technologies disclosed herein, the server computer 112 can also store the software code 110, either by virtue of the software code 110 being created via the development application 108 at the server computer 112 and storing the software code 110 at the server computer 112, or by the computing device 102 sending the software code 110 to the server computer 112 (e.g., via a portal, an application programming interface ("API"), a data session, or the like). Without regard to how the software code 110 is obtained by the server computer 112, the server computer 112 can be configured to store the software code 110 and perform various other operations on the software code 110 in accordance with various embodiments of the concepts and technologies disclosed herein.

In particular, as shown in FIG. 1, the server computer 112 can execute and/or host other applications, programs, engines, modules, services, or the like including a security scan engine 114 and a deployment engine 116. The functionality of these entities will be explained in more detail below. Although the development application 108, the security scan engine 114, and the deployment engine 116 are illustrated as separate applications, and although these applications are illustrated as being stored at the server computer 112, it should be understood that these applications or combinations thereof may be embodied as or in one or more applications and/or can be stored and/or executed by other devices that may operate as part of or in communication with the network 104 and/or the server computer 112. As such, the illustrated embodiment should be understood as being illustrative of only some contemplated embodiments and should not be construed as being limiting in any way.

The security scan engine 114 can be configured to perform security scans on the software code 110 during the development process and/or prior to deployment or attempted deployment of the software code 110. In particular, embodiments of the concepts and technologies disclosed herein include the security scan engine 114 detecting a check-in, submission, upload, completion of authoring, or other indication that the software code 110 has been prepared for deployment as an application, service, module or the like ("application") 118. As will be explained in more detail hereinbelow, the application 118 can be deployed to an application server 120 or other device once scanned and approved for deployment. It should be understood that this example is illustrative, and therefore should not be construed as being limiting in any way.

The security scan engine 114 can be configured to perform a security scan of the software code 110 when a submission of the software code 110 is detected. It should be understood that according to various embodiments of the concepts and technologies disclosed herein, the security scan performed by and/or triggered by the security scan engine 114 can be performed automatically, without any request to deploy the software code 110 and/or application 118 based on and/or including the software code 110. Thus, it can be appreciated that the security scan engine 114 can be configured to scan the software code 110 upon obtaining the software code 110, which in some instances can be prior to compiling the software code 110 and/or generating the application 118. It should be understood that this example is illustrative, and therefore should not be construed as being limiting in any way.

According to various embodiments of the concepts and technologies disclosed herein, the security scan engine 114 can be configured to generate, based on the security scan, a security scan report 122. In some embodiments, the security scan engine 114 can generate the security scan report 122 during the security scan and can send the security scan report 122 to a device associated with the software code 110 (e.g., the computing device 102 in FIG. 1). In some other embodiments, the security scan engine 114 may not send the security scan report 122 to the computing device 102 (or other recipient) until a request to deploy the software code 110 (e.g., as the application 118) is detected. It should be understood that this example is illustrative, and therefore should not be construed as being limiting in any way.

According to various embodiments of the concepts and technologies disclosed herein, the security scan engine 114 can be configured to analyze the software code 110 to identify any vulnerabilities or other security concerns (e.g., privacy concerns, instability concerns, or the like) in the software code 110. In some embodiments, the security scan engine 114 can be configured to call one or more software code scanning providers ("scan providers") 124 and the scan providers 124 can scan the software code 110 to identify any vulnerabilities that may exist in the software code 110. In some embodiments, the security scan engine 114 also can be configured to access one or more libraries 126 that can store definitions of vulnerabilities, in some embodiments, or other information that may be used to perform the security scan of the software code 110. The functionality of the libraries 126 can be provided, in some embodiments, by one or more databases, server computers, desktop computers, data storage resources, other computing systems, and the like. In some embodiments of the concepts and technologies disclosed herein, the libraries 126 also can be configured to store the software code 110 and, as such, it can be appreciated that the software code 110 can be obtained from the libraries 126 in some embodiments. It should be understood that this example is illustrative, and therefore should not be construed as being limiting in any way.

At some point in time, and not necessarily immediately after performing (or triggering) the security scan of the software code 110, the security scan engine 114 can detect a request to deploy the software code 110, for example as the application 118. Upon detecting the request to deploy the application 118, the security scan engine 114 can be configured to determine if any vulnerabilities exist in the software code 110. If the security scan engine 114 determines that no vulnerabilities were detected during the security scan of the software code 110, the security scan engine 114 can be configured to invoke the deployment engine 116 to deploy the application 118, for example to the application server 120. It should be understood that this example is illustrative, and therefore should not be construed as being limiting in any way.

If the security scan engine 114 determines that vulnerabilities were detected during the security scan of the software code 110, the security scan engine 114 can be configured to prevent, stop, pause, or terminate the deployment of the application 118 and to output a security scan report 122 that details the identified vulnerabilities. In some embodiments, the security scan engine 114 can deliver, or trigger the delivery of, the security scan report 122 to one or more devices such as, for example, the computing device 102. In some embodiments, the security scan report 122 can be output to the computing device 102 via a web interface (e.g., in a webpage accessed by the computing device 102), and in some embodiments the security scan report 122 can be sent as a file to the computing device 102. Because the security scan report 122 can be provided to the computing device 102 and/or other entities in various manners, it should be understood that this example is illustrative, and therefore should not be construed as being limiting in any way.

The security scan engine 114 and/or the development application 108 can be configured to track remediation activities associated with the software code 110. Thus, for example, the security scan engine 114 and/or the development application 108 can be configured to track changes to the software code 110, and to determine if the changes address any of the identified vulnerabilities. In some embodiments, the security scan engine 114 can output the security scan report 122 to the development application 108 (at the server computer 112 and/or at the computing device 102) so that changes to the software code 110 can be tracked and determined to be (or not to be) addressing one or more detected vulnerabilities. It should be understood that this example is illustrative, and therefore should not be construed as being limiting in any way.

At some point in time, but not necessarily immediately after, outputting the security scan report 122 and/or detecting some remediation or other change to the software code 110, the security scan engine 114 can detect another request to deploy the software code 110, for example as the application 118. Upon detecting the request to deploy the application 118, the security scan engine 114 can be configured to again determine if any vulnerabilities exist in the software code 110 and/or if the previously-identified vulnerabilities have been remediated. If the security scan engine 114 determines that no vulnerabilities exist and/or that the previously-noted vulnerabilities have been remediated, the security scan engine 114 can be configured to invoke the deployment engine 116 to deploy the application 118, for example to the application server 120. If additional vulnerabilities are detected and/or if some previously-noted vulnerabilities have not been remediated, another security scan report 122 can be generated. Thus, it can be appreciated that the scanning and checking for vulnerabilities and/or checking for remediation can be iterated until the software code 110 is ready for deployment as the application 118 in some embodiments. It should be understood that this example is illustrative, and therefore should not be construed as being limiting in any way.

The deployment engine 116 can be configured to deploy the software code 110 when the security scan reveals no vulnerabilities and/or that all previously-detected vulnerabilities have been remediated in the software code 110. According to various embodiments, the deployment engine 116 can be configured to compile the software code 110, to build object code, and/or otherwise generate a deployable version of the software code 110 (e.g., as the application 118). The deployment engine 116 also can be configured to identify one or more resources that will host the application 118 such as, for example, the application server 120, a virtual machine and/or data storage resource (e.g., in a cloud computing environment such as a data center, or the like). The deployment engine 116 can also coordinate the deployment of the application 118 to the identified resource(s), for example, the application server 120. In some embodiments, the deployment engine 116 can invoke other devices or entities (e.g., an orchestrator or the like) to instantiate resources and/or deploy the application 118. It should be understood that these examples are illustrative, and therefore should not be construed as being limiting in any way.

In some embodiments of the concepts and technologies disclosed herein, functionality for providing an override command or request ("override") 130 can be provided. The override 130 can order or request the development application 108, the security scan engine 114, and/or the deployment engine 116, to ignore certain perceived vulnerabilities in the software code 110. In various embodiments, the override 130 can include data that identifies the vulnerability in the software code 110 that is to be allowed to exist in the software code 110 (e.g., a security or other vulnerability that will not prevent deployment of the software code 110 as the application 118 once the override 130 is received and acted on by the development application 108, the security scan engine 114, and/or the deployment engine 116).

In some embodiments, the development application 108, the security scan engine 114, and/or the deployment engine 116 may be configured to interrupt, pause, or prevent deployment of software code 110 as the application 118 if any vulnerability is detected in the software code 110, even if the perceived vulnerability may not in fact be a vulnerability and/or otherwise may be acceptable in the application 118. A user or other entity (e.g., the computing device 102 or a manager device 128 and/or another device interacting with the development application 108, the security scan engine 114, and/or the deployment engine 116) may trigger an override 130 to allow the software code 110 to be deployed with the perceived vulnerability. In some embodiments, the author of the software code 110 may indicate that the perceived vulnerability should be overridden and the development application 108, the security scan engine 114, and/or the deployment engine 116 can seek confirmation from an authorized entity such as the manager device 128, with that confirmation (if granted) being received as the override 130. It should be understood that this example is illustrative, and therefore should not be construed as being limiting in any way.

The manager device 128 can communicate, in some embodiments, with the development application 108, the security scan engine 114, and/or the deployment engine 116 via a portal, API, or the like, to trigger deployment of the application 118 in some embodiments even if perceived vulnerabilities exist in the software code 110. It should be understood that this example is illustrative, and therefore should not be construed as being limiting in any way.

In practice, software code 110 can be obtained by a server computer 112, for example from one or more libraries 126 and/or via interactions with a development application 108, which can be executed by the server computer 112 and/or by other devices such as a computing device 102. Prior to any user or author requesting deployment of the software code 110 (e.g., as an application 118), the server computer 112 can, via execution of a security scan engine 114, perform a security scan of the software code 110 to search for vulnerabilities such as security vulnerabilities, privacy vulnerabilities, stability flaws, and/or other errors in the software code 110 that can affect the performance and/or security of an application 118 based on the software code 110. According to various embodiments of the concepts and technologies disclosed herein, the security scan is performed only to identify security vulnerabilities in the software code 110. In some embodiments, the security scan engine 114 can perform the security scan on the software code 110 and/or the security scan engine 114 can invoke one or more scanners provided by one or more scan providers 124. Thus, it can be appreciated that the scan providers 124 can provide security scanning capability for the security scan engine 114 in some embodiments as applets, plugins, or the like. It should be understood that this example is illustrative, and therefore should not be construed as being limiting in any way.

At some point after obtaining the software code 110 and performing one or more security scans on the software code 110, the security scan engine 114 (or other module or application at the server computer 112) can detect a request to deploy the software code 110 and/or an application 118 based on the software code 110. Upon detecting the request to deploy the software code 110 the security scan engine 114 can determine if the software code 110 includes any vulnerabilities. In some embodiments the determination can include identifying vulnerabilities and an associated threat level and/or threat severity such as low, medium, high, critical, etc.

If any vulnerabilities are detected, or any vulnerabilities of a specified threat level (e.g., low, medium, high, critical, etc.) are detected, the security scan engine 114 can terminate deployment of the software code 110, generate a security scan report 122 that identifies detected vulnerabilities and their associated threat levels, and output the security scan report 122 to a device or entity associated with software code 110 such as the author at a computing device 102, a manager at a manager device 128, or other entity). In some embodiments, an authorized entity such as a manager device 128 can be requested or otherwise given the opportunity to generate an override for any vulnerabilities detected in the software code 110. If no vulnerabilities are detected, or if any vulnerabilities detected are under a specified threat level (e.g., only low threat vulnerabilities; only low and/or medium threat vulnerabilities; only low, medium, and/or high threat vulnerabilities; or the like) are detected, the security scan engine 114 can initiate or trigger the initiation of deployment of the software code 110 and/or take other actions.

In some embodiments, the security scan engine 114 can be configured, in a case where deployment has been paused or terminated, to monitor changes to the software code 110. If changes are detected, the security scan engine 114 can perform another security scan of the software code 110 to determine if any vulnerabilities have been remediated and/or if any other vulnerabilities exist in the software code 110. If another request to deploy the software code 110 is detected, the security scan engine 114 can again determine if the software code 110 is to be deployed. This process can be iterated until the security scan engine 114 determines that either no vulnerabilities exist in the software code 110, that no vulnerabilities above a specified threat level exist in the software code 110, and/or that any vulnerabilities above a specified threat level have been exempted by an authorized entity by way of an override 130. It should be understood that this example is illustrative, and therefore should not be construed as being limiting in any way.

The security scan engine 114 can deploy, or trigger other devices or entities such as the deployment engine 116 to deploy the software code 110 and/or an application 118 based on the software code 110. According to various embodiments of the concepts and technologies disclosed herein, the software code 110 can be compiled, used to build object code, and/or otherwise used to generate a deployable version of the software code 110 (e.g., as the application 118). The deployment engine 116 can identify one or more resources that will host the application 118 such as, for example, the application server 120, a virtual machine and/or data storage resource (e.g., in a cloud computing environment such as a data center, or the like). The deployment engine 116 also can coordinate the deployment of the application 118 to the identified resource(s), for example by invoking or triggering other devices or entities (e.g., an orchestrator or the like) to instantiate resources and/or deploy the application 118. It should be understood that these examples are illustrative, and therefore should not be construed as being limiting in any way.

FIG. 1 illustrates one computing device 102, one network 104, one server computer 112, one application server 120, one instance of scan providers 124, and/or one instance of libraries 126. It should be understood, however, that various implementations of the operating environment 100 can include one or more than one computing device 102; zero, one, or more than one network 104; one or more than one server computer 112; zero, one, or more than one application server 120 (or other resources that can host the application 118); zero, one, or more than one instance of scan providers 124; and/or zero, one, or more than one instance of libraries 126. As such, the illustrated embodiment should be understood as being illustrative, and should not be construed as being limiting in any way.

Figure 2:
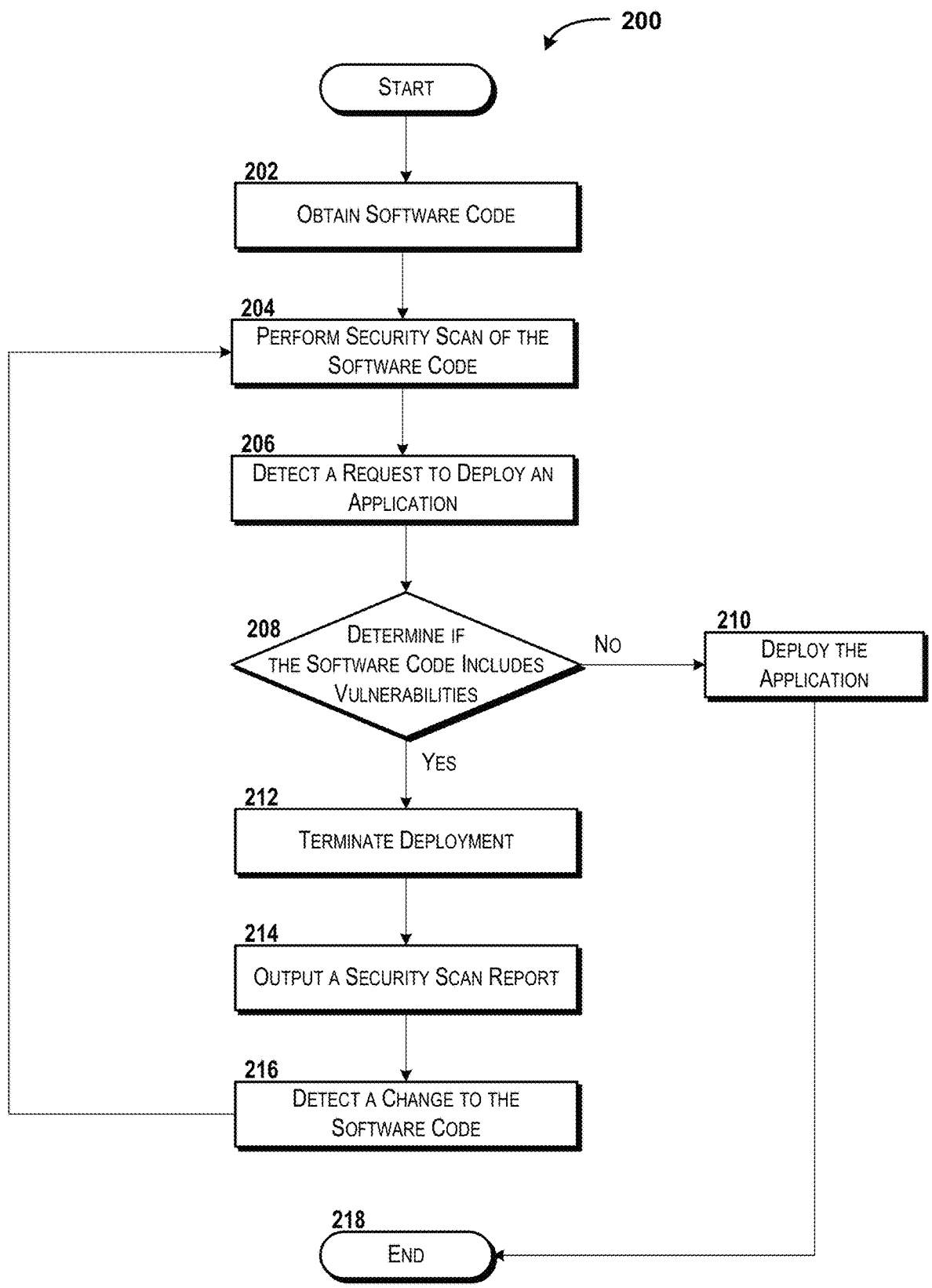
FIG. 2 is a flow diagram showing aspects of a method for validating and deploying software code, according to an illustrative embodiment of the concepts and technologies described herein.

Turning now to FIG. 2, aspects of a method 200 for validating and deploying software code will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 112, to perform one or more operations and/or causing the processor to direct other components of the computing system or device to perform one or more of the operations.

For purposes of illustrating and describing the concepts of the present disclosure, the method 200 is described herein as being performed by the server computer 112 via execution of one or more software modules such as, for example, the development application 108, the security scan engine 114, and/or the deployment engine 116. It should be understood that additional and/or alternative devices and/or network nodes can provide the functionality described herein via execution of one or more modules, applications, and/or other software including, but not limited to, the development application 108, the security scan engine 114, and/or the deployment engine 116. Thus, the illustrated embodiments are illustrative, and should not be viewed as being limiting in any way.

The method 200 begins at operation 202. At operation 202, the server computer 112 can obtain software code 110. According to various embodiments of the concepts and technologies disclosed herein, the software code 110 can be obtained in operation 202 by being created via the development application 108 at the server computer 112 and storing the software code 110 at the server computer 112, by the computing device 102 sending, uploading, and/or otherwise providing the software code 110 to the server computer 112 (e.g., via a portal, an application programming interface ("API"), a data session, or the like), and/or in other manners. The server computer 112 can be configured to store the software code 110 in a local or remote data storage device or resource. According to various embodiments of the concepts and technologies disclosed herein, the server computer 112 can be configured to detect the creation and/or receipt of the software code 110 in operation 202, for example by detecting creation and/or storage of the software code 110, by detecting receipt of a file or data corresponding to the software code 110, or the like.

From operation 202, the method 200 can proceed to operation 204. At operation 204, the server computer 112 can perform a security scan of the software code 110. According to various embodiments of the concepts and technologies disclosed herein, the server computer 112 can be configured to perform security scans on the software code 110 during the development process and/or prior to a request to deploy the software code 110. In particular, embodiments of the concepts and technologies disclosed herein include the server computer 112 detecting a check-in, submission, upload, completion of authoring, or other indication that the software code 110 has been obtained in operation 202. The server computer 112 can be configured to perform a security scan of the software code 110 when the server computer 112 detects that the server computer 112 has obtained the software code 110.

The security scan performed by and/or triggered by the server computer 112 can be performed automatically, without any request to deploy the software code 110 and/or application 118 based on and/or including the software code 110. Thus, it can be appreciated that the server computer 112 can be configured to scan the software code 110 upon obtaining the software code 110, which in some instances can be prior to compiling the software code 110 and/or generating the application 118. Thus, the concepts and technologies disclosed herein do not require a request to deploy the application 118 to perform the security scans illustrated and described herein, in some embodiments. It should be understood that this example is illustrative, and therefore should not be construed as being limiting in any way.

According to various embodiments of the concepts and technologies disclosed herein, the server computer 112 can be configured to analyze the software code 110 to identify any vulnerabilities in the software code 110 and/or other security concerns. In some embodiments, the server computer 112 can be configured to perform the security scan using the security scan engine 114 and/or by invoking or calling one or more scan providers 124. It can be appreciated that the scan providers 124 can be services for scanning the software code 110 and can be updated by the developers associated therewith. Thus, various embodiments of the concepts and technologies disclosed herein include scanning the software code 110 using the security scan engine 114 and the scan providers 124 to identify any vulnerabilities or other security concerns (e.g., privacy concerns, instabilities, etc.) that may exist in the software code 110. It should be understood that this example is illustrative, and therefore should not be construed as being limiting in any way.

In some embodiments, the server computer 112 also can be configured to access one or more libraries 126 that can store definitions of vulnerabilities and/or other security concerns as illustrated and described herein. Thus, various embodiments of the concepts and technologies disclosed herein include scanning the software code 110 using the security scan engine 114, the scan providers 124, and/or the libraries 126 to identify any vulnerabilities or other security concerns (e.g., privacy concerns, instabilities, etc.) that may exist in the software code 110. It should be understood that this example is illustrative, and therefore should not be construed as being limiting in any way.

From operation 204, the method 200 can proceed to operation 206. At operation 206, the server computer 112 can detect a request to deploy an application 118. The server computer 112 can detect, for example, a command or other instruction or request to deploy the software code 110 as the application 118. Upon detecting the request to deploy the application 118, the server computer 112 can be configured to determine if any vulnerabilities exist in the software code 110, which as noted above can be detected during the security scan performed in operation 204. In some embodiments, the results of the security scan may not be shared with other entities (e.g., the computing device 102, the manager device 128, or the like) until a deployment is requested for the software code 110. Thus, updates to the software code 110 can be made and security scans performed for iterations of the software code 110 any number of times before the request to deploy the application 118 is detected in operation 206. Thus, embodiments of the concepts and technologies disclosed herein can provide repeated or even continuous security scanning of the software code 110 to check for security concerns such as vulnerabilities. It should be understood that this example is illustrative, and therefore should not be construed as being limiting in any way.

From operation 206, the method 200 can proceed to operation 208. At operation 208, the server computer 112 can determine if the software code 110 includes one or more vulnerabilities. As noted above, the results of the security scan may not be considered by the server computer 112 until a request to deploy the application 118 is received by the server computer 112. At any rate, in operation 208 the server computer 112 can determine if any security concerns were identified in the security scan of the software code 110 in operation 204.

If the server computer 112 determines, in operation 208, that no vulnerabilities or other security concerns were detected during the security scan of the software code 110, the method 200 can proceed to operation 210. At operation 210, the server computer 112 can deploy, or trigger other devices or entities to deploy, the application 118. In some embodiments, the server computer 112 can be configured to invoke the deployment engine 116 to deploy the application 118, for example to the application server 120. According to various embodiments of the concepts and technologies disclosed herein, the functionality of operation 210 can include, for example, compiling the software code 110, building object code, and/or otherwise generating a deployable version of the software code 110 (e.g., as the application 118).

In some embodiments of operation 210, the server computer 112 can be configured to identify one or more resources that will host the application 118 such as, for example, the application server 120, a virtual machine and/or data storage resource (e.g., in a cloud computing environment such as a data center, or the like). In some other embodiments, the server computer 112 can be configured to coordinate the deployment of the application 118 to the identified resource(s), for example, the application server 120 by invoking or triggering other devices or entities (e.g., an orchestrator or the like) to instantiate resources and/or deploy the application 118. As such, operation 210 can include deploying the application 118 and/or triggering the deployment of the application 118. It should be understood that these examples are illustrative, and therefore should not be construed as being limiting in any way.

If the server computer 112 determines, in operation 208, that the software code 110 does include one or more vulnerabilities or other security concerns, the method 200 can proceed to operation 212. At operation 212, the server computer 112 can terminate the deployment requested in operation 206. Termination of the deployment can include any operations to prevent the application 118 from being activated on a resource such as the application server 120 such as preventing instantiation of a resource to host the application 118, preventing activation of the application 118, or the like. Because the deployment can be terminated in various manners, it should be understood that these examples are illustrative, and therefore should not be construed as being limiting in any way.

From operation 212, the method 200 can proceed operation 214. At operation 214, the server computer 112 can be configured to output a security scan report 122. Operation 214 can include generating the security scan report 122, storing the security scan report 122, and/or outputting the security scan report 122 to a recipient such as the computing device 102. The security scan report 122 can provide details about the identified vulnerabilities and/or other security concerns associated with the software code 110. In some embodiments, operation 214 can include the server computer 112 delivering or triggering the delivery of the security scan report 122 to one or more devices such as, for example, the computing device 102. In some embodiments, the security scan report 122 can be output to the computing device 102 via a web interface (e.g., in a webpage accessed by the computing device 102). In some other embodiments, the security scan report 122 can be sent as a file to the computing device 102. Because the security scan report 122 can be provided to the computing device 102 and/or other entities in various manners, it should be understood that this example is illustrative, and therefore should not be construed as being limiting in any way.

From operation 214, the method 200 can proceed to operation 216. At operation 216, the server computer 112 can detect a change to the software code 110. According to various embodiments of the concepts and technologies disclosed herein, the server computer 112 can be configured to track activities associated with the software code 110 including any changes to the software code 110 (e.g., as part of remediating vulnerabilities and/or other security concerns detected by the server computer 112, addition of features, removal of features, or the like). Thus, operation 214 can include the server computer 112 detecting that a change has been made to the software code 110. According to various embodiments of the concepts and technologies disclosed herein, the changes detected in operation 216 can correspond to a change that addresses (and hopefully remediates) any identified vulnerabilities and/or other security concerns. It should be understood that this example is illustrative, and therefore should not be construed as being limiting in any way.

From operation 216, the method 200 can return to operation 204, and the server computer 112 can again perform a security scan on the software code 110. Operations 204-216 can be iterated until the server computer 112 determines, in any iteration of operation 208, that the software code 110 does not include any vulnerabilities and the software code 110 is deployed at operation 210. From operation 210, the method 200 can proceed to operation 218. The method 200 can end at operation 218.

Figure 3:
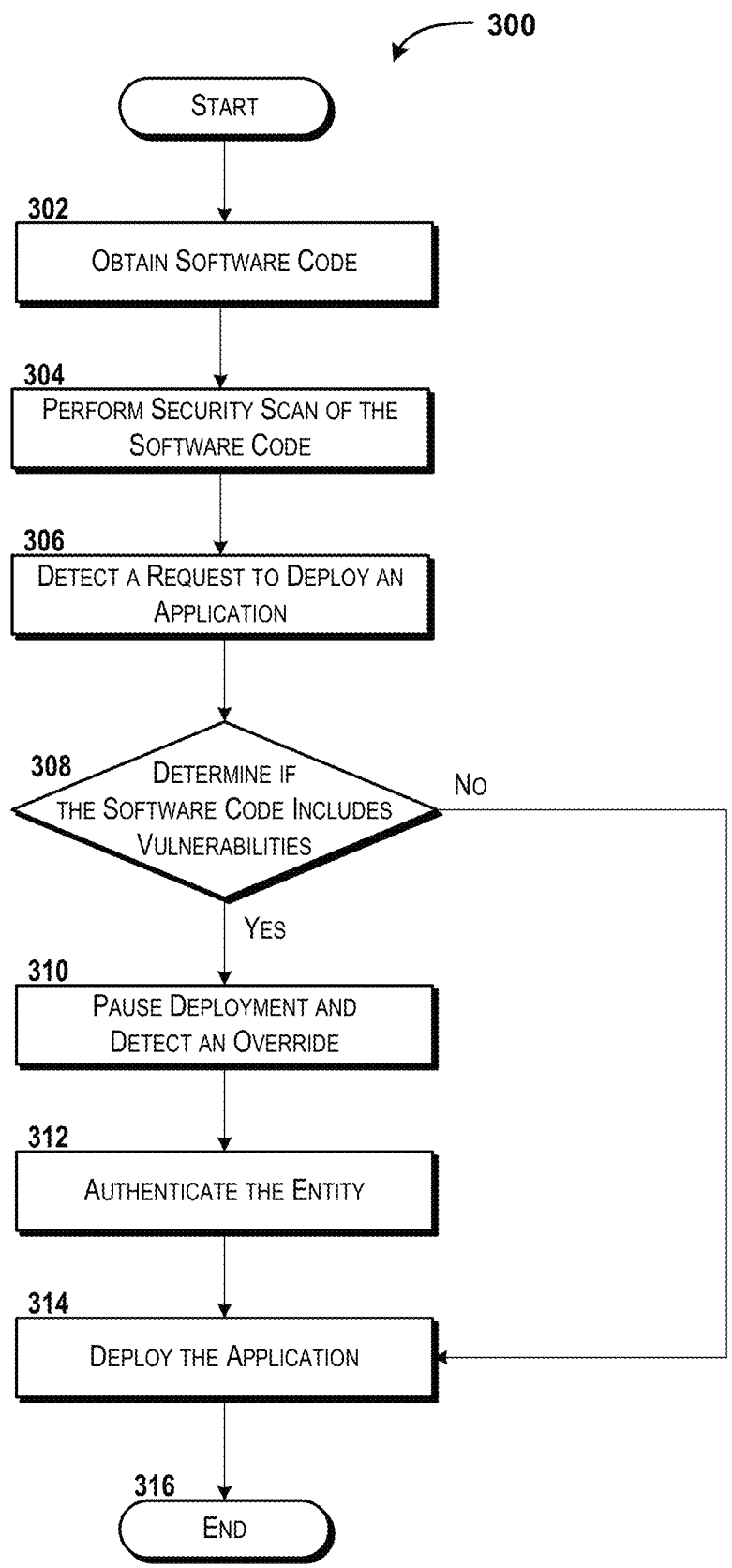
FIG. 3 is a flow diagram showing aspects of a method for validating and deploying software code, according to another illustrative embodiment of the concepts and technologies described herein.

Turning now to FIG. 3, aspects of a method 300 for validating and deploying software code will be described in detail, according to an illustrative embodiment. For purposes of illustrating and describing the concepts of the present disclosure, the method 300 is described herein as being performed by the server computer 112 via execution of one or more software modules such as, for example, the development application 108, the security scan engine 114, and/or the deployment engine 116. It should be understood that additional and/or alternative devices and/or network nodes can provide the functionality described herein via execution of one or more modules, applications, and/or other software including, but not limited to, the development application 108, the security scan engine 114, and/or the deployment engine 116. Thus, the illustrated embodiments are illustrative, and should not be viewed as being limiting in any way.

The method 300 begins at operation 302. At operation 302, the server computer 112 can obtain software code 110. According to various embodiments of the concepts and technologies disclosed herein, the software code 110 can be obtained in operation 302 by being created via the development application 108 at the server computer 112 and storing the software code 110 at the server computer 112, by the computing device 102 sending, uploading, and/or otherwise providing the software code 110 to the server computer 112 (e.g., via a portal, an API, a data session, or the like), and/or in other manners. The server computer 112 can be configured to store the software code 110 in a local or remote data storage device or resource. According to various embodiments of the concepts and technologies disclosed herein, the server computer 112 can be configured to detect the creation and/or receipt of the software code 110 in operation 302, for example by detecting creation and/or storage of the software code 110, by detecting receipt of a file or data corresponding to the software code 110, or the like.

From operation 302, the method 300 can proceed to operation 304. At operation 304, the server computer 112 can perform a security scan of the software code 110. According to various embodiments of the concepts and technologies disclosed herein, the server computer 112 can be configured to perform security scans on the software code 110 during the development process and/or prior to a request to deploy the software code 110. In particular, embodiments of the concepts and technologies disclosed herein include the server computer 112 detecting a check-in, submission, upload, completion of authoring, or other indication that the software code 110 has been obtained in operation 302. The server computer 112 can be configured to perform a security scan of the software code 110 when the server computer 112 detects that the server computer 112 has obtained the software code 110.

The security scan performed by and/or triggered by the server computer 112 can be performed automatically, without any request to deploy the software code 110 and/or application 118 based on and/or including the software code 110. Thus, it can be appreciated that the server computer 112 can be configured to scan the software code 110 upon obtaining the software code 110, which in some instances can be prior to compiling the software code 110 and/or generating the application 118. Thus, the concepts and technologies disclosed herein do not require a request to deploy the application 118 to perform the security scans illustrated and described herein, in some embodiments. It should be understood that this example is illustrative, and therefore should not be construed as being limiting in any way.

According to various embodiments of the concepts and technologies disclosed herein, the server computer 112 can be configured to analyze the software code 110 to identify any vulnerabilities in the software code 110 and/or other security concerns. In some embodiments, the server computer 112 can be configured to perform the security scan using the security scan engine 114 and/or by invoking or calling one or more scan providers 124. It can be appreciated that the scan providers 124 can be services for scanning the software code 110 and can be updated by the developers associated therewith. Thus, various embodiments of the concepts and technologies disclosed herein include scanning the software code 110 using the security scan engine 114 and the scan providers 124 to identify any vulnerabilities or other security concerns (e.g., privacy concerns, instabilities, etc.) that may exist in the software code 110. It should be understood that this example is illustrative, and therefore should not be construed as being limiting in any way.

In some embodiments, the server computer 112 also can be configured to access one or more libraries 126 that can store definitions of vulnerabilities and/or other security concerns as illustrated and described herein. Thus, various embodiments of the concepts and technologies disclosed herein include scanning the software code 110 using the security scan engine 114, the scan providers 124, and/or the libraries 126 to identify any vulnerabilities or other security concerns (e.g., privacy concerns, instabilities, etc.) that may exist in the software code 110. It should be understood that this example is illustrative, and therefore should not be construed as being limiting in any way.

From operation 304, the method 300 can proceed to operation 306. At operation 306, the server computer 112 can detect a request to deploy an application 118. The server computer 112 can detect, for example, a command or other instruction or request to deploy the software code 110 as the application 118. Upon detecting the request to deploy the application 118, the server computer 112 can be configured to determine if any vulnerabilities exist in the software code 110, which as noted above can be detected during the security scan performed in operation 304. In some embodiments, the results of the security scan may not be shared with other entities (e.g., the computing device 102, the manager device 128, or the like) until a deployment is requested for the software code 110. Thus, updates to the software code 110 can be made and security scans performed for iterations of the software code 110 any number of times before the request to deploy the application 118 is detected in operation 306. Thus, embodiments of the concepts and technologies disclosed herein can provide repeated or even continuous security scanning of the software code 110 to check for security concerns such as vulnerabilities. It should be understood that this example is illustrative, and therefore should not be construed as being limiting in any way.

From operation 306, the method 300 can proceed to operation 308. At operation 308, the server computer 112 can determine if the software code 110 includes one or more vulnerabilities. As noted above, the results of the security scan may not be considered by the server computer 112 until a request to deploy the application 118 is received by the server computer 112. At any rate, in operation 308 the server computer 112 can determine if any security concerns were identified in the security scan of the software code 110 in operation 304.

If the server computer 112 determines, in operation 308, that the software code 110 includes one or more vulnerabilities or other security concerns, the method 300 can proceed to operation 310. At operation 310, the server computer 112 can pause or terminate the deployment requested in operation 306 until an override is detected. According to various embodiments, pausing or terminating the deployment can include operations to prevent the application 118 from being activated on a resource, such as the application server 120, such as preventing instantiation of a resource to host the application 118, preventing activation of the application 118, or the like. The deployment can be paused or terminated for any amount of time until an override command or request is received from an entity such as, for example, the computing device 102 or the manager device 128 illustrated and described with reference to FIG. 1.

In various embodiments of the concepts and technologies disclosed herein, the server computer 112 can be configured to inform the computing device 102 that a vulnerability or security concern has been detected in the software code and the computing device 102 and/or the manager device 128 can submit an override command or request to the server computer 112. Because the override command or request can be obtained in additional and/or alternative manners, it should be understood that these examples are illustrative, and therefore should not be construed as being limiting in any way.

From operation 310, the method 300 can proceed to operation 312. At operation 312, the server computer 112 can authenticate an entity associated with the override command or request detected in operation 310. Thus, operation 312 can correspond to the server computer 112 authenticating a user or device that generated or submitted the override command or request detected in operation 310. In various embodiments, the server computer 112 can authenticate the computing device 102 or the manager device 128. It should be understood that this example is illustrative, and therefore should not be construed as being limiting in any way.

It can be appreciated that although not illustrated in FIG. 3, if the entity associated with the override command or request is not authenticated successfully in operation 312, the deployment can be paused or terminated and/or other operations can be performed (e.g., generating a security scan report 122 and returning flow of the method 300 to operation 304). It should be understood that this example is illustrative, and therefore should not be construed as being limiting in any way. If the entity is successfully authenticated in operation 312, the method 300 can proceed to operation 314. The method 300 also can proceed to operation 314 if the server computer 112 determines, in operation 308, that no vulnerabilities or other security concerns were detected during the security scan of the software code 110.

At operation 314, the server computer 112 can deploy, or trigger other devices or entities to deploy, the application 118. In some embodiments, the server computer 112 can be configured to invoke the deployment engine 116 to deploy the application 118, for example, to the application server 120. According to various embodiments of the concepts and technologies disclosed herein, the functionality of operation 314 can include, for example, compiling the software code 110, building object code, and/or otherwise generating a deployable version of the software code 110 (e.g., as the application 118).

In some embodiments of operation 314, the server computer 112 can be configured to identify one or more resources that will host the application 118 such as, for example, the application server 120, a virtual machine and/or data storage resource (e.g., in a cloud computing environment such as a data center, or the like). In some other embodiments, the server computer 112 can be configured to coordinate the deployment of the application 118 to the identified resource(s), for example, the application server 120 by invoking or triggering other devices or entities (e.g., an orchestrator or the like) to instantiate resources and/or deploy the application 118. As such, operation 314 can include deploying the application 118 and/or triggering the deployment of the application 118. It should be understood that these examples are illustrative, and therefore should not be construed as being limiting in any way.

From operation 314, the method 300 can proceed to operation 316. The method 300 can end at operation 316.

Figures 4A, 4B:
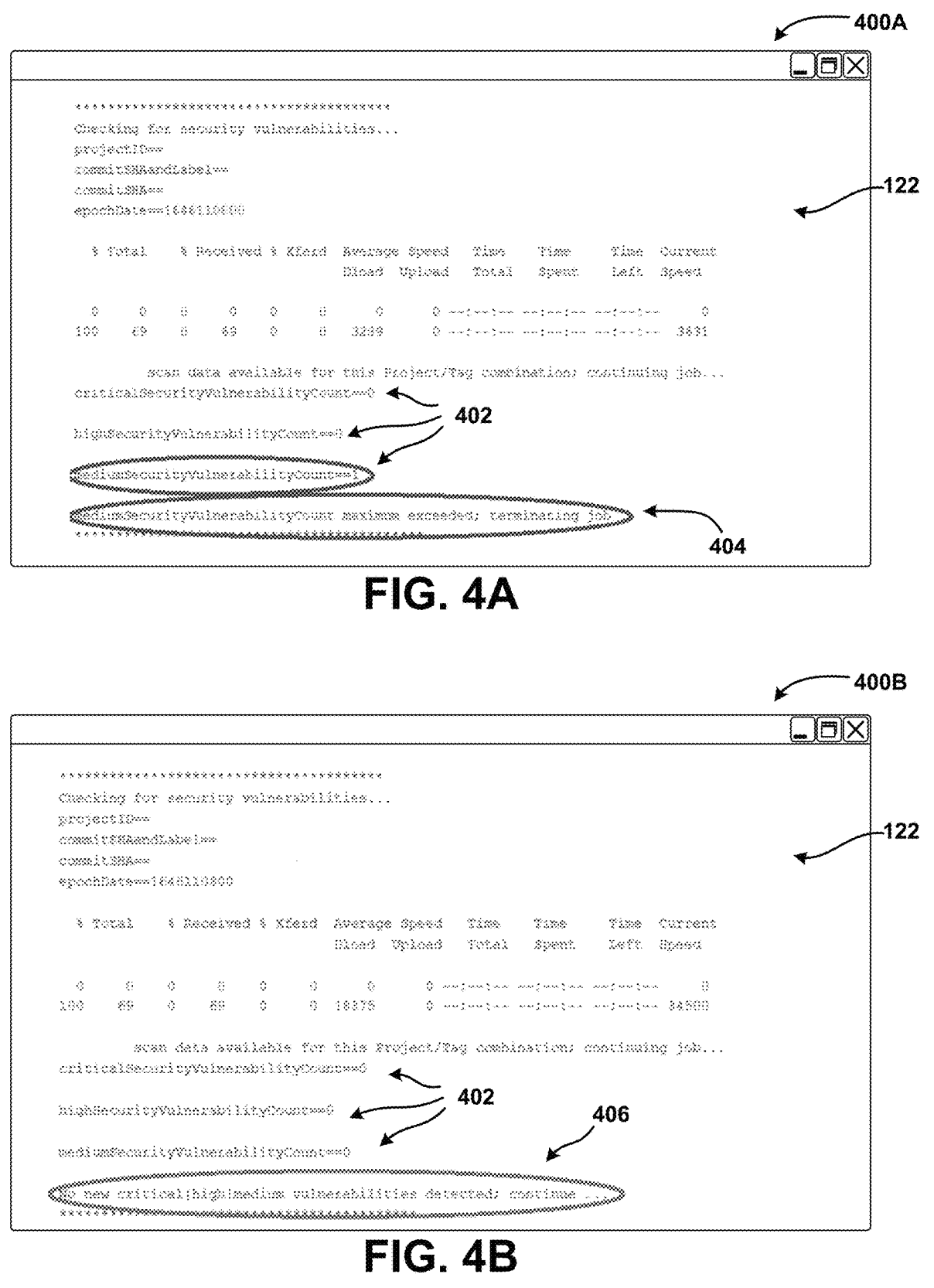

Turning now to FIGS. 4A-4B, two example embodiments of viewing the security scan report 122 will be illustrated and described. Namely, FIG. 4A illustrates a screen display 400A that can be presented at a device such as, for example, the computing device 102, the manager device 128, and/or other devices. The screen display 400A can present a user interface that includes the security scan report 122. Because the illustrated security scan report is illustrative of one example embodiment of the security scan report 122, it should be understood that this example is illustrative, and therefore should not be construed as being limiting in any way.

As shown in FIG. 4A, the security scan report 122 can include one or more indications of a number of vulnerabilities ("vulnerability count indicators") 402 that can present to a viewer a number of vulnerabilities detected in the software code 110 during the security scan(s). In the illustrated embodiment, the security scan report 122 includes vulnerability count indicators 402 presenting a number of vulnerabilities at various threat levels such as, for example, a high security threat, a medium security threat, a low security threat, or the like. In the illustrated embodiment, the vulnerability count indicators 402 indicate that zero high risk vulnerabilities have been detected in the software code 110 and that one medium risk vulnerability has been detected in the software code 110. It should be understood that this example is illustrative, and therefore should not be construed as being limiting in any way.

The security scan report 122 also can include an action indicator 404 that can present and/or communicate an action being taken (e.g., by the development application 108, the security scan engine 114, and/or the deployment engine 116) in light of the detected vulnerability. In the illustrated embodiment, the action indicator 404 indicates that the deployment is being terminated. Because other actions can be taken in accordance with embodiments of the concepts and technologies disclosed herein (e.g., pausing deployment, allowing remediation, allowing request or generation of an override 130), it should be understood that this example is illustrative, and therefore should not be construed as being limiting in any way.

FIG. 4B illustrates a screen display 400B that can be presented at a device such as, for example, the computing device 102, the manager device 128, and/or other devices. The screen display 400B can present a user interface that includes the security scan report 122. Because the illustrated security scan report is illustrative of one example embodiment of the security scan report 122, it should be understood that this example is illustrative, and therefore should not be construed as being limiting in any way.

In the example embodiment illustrated in FIG. 4B, the security scan report 122 includes vulnerability count indicators 402 that indicate that zero high risk vulnerabilities have been detected in the software code 110 and that zero medium risk vulnerability has been detected in the software code 110. Thus, the example shown in FIG. 4B also includes an action indicator 406 that indicates that the deployment is proceeding. Because other actions can be taken in accordance with embodiments of the concepts and technologies disclosed herein, it should be understood that this example is illustrative, and therefore should not be construed as being limiting in any way.

Figure 5:
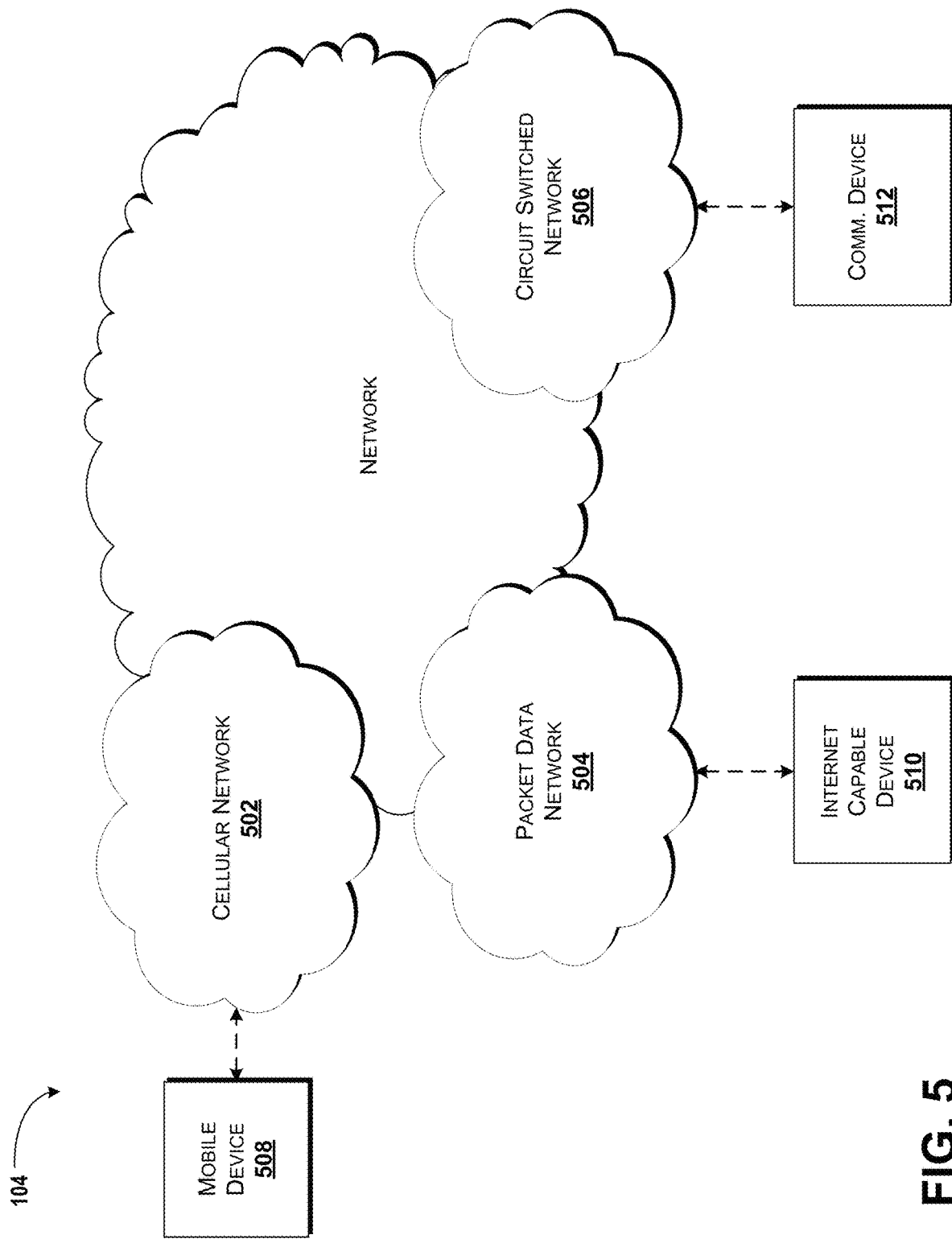
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards, 5G mobile communications standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
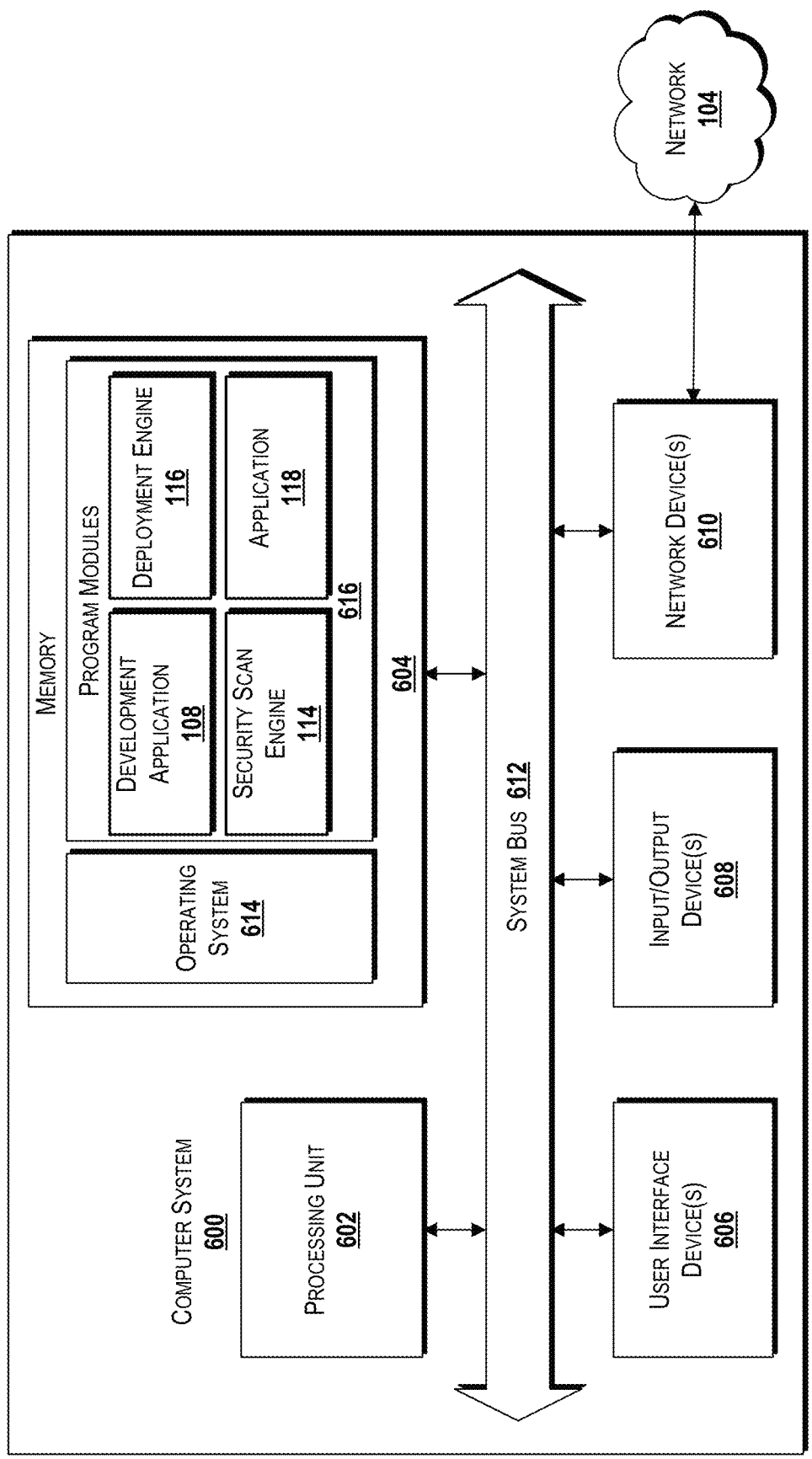
FIG. 6 is a block diagram illustrating an example computer system configured to provide automated software code validation and deployment, according to some illustrative embodiments of the concepts and technologies described herein.

FIG. 6 is a block diagram illustrating a computer system 600 configured to provide the functionality described herein for automated software code validation and deployment, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the development application 108, the security scan engine 114, the deployment engine 116, the application 118, and/or the scan providers 124. These and/or other programs can be embodied in computer-readable media containing instructions that, when executed by the processing unit 602, perform one or more of the methods 200 and 300 described in detail above with respect to FIGS. 2-3 and/or other functionality as illustrated and described herein. It can be appreciated that, at least by virtue of the instructions embodying the methods 200 and 300, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the software code 110, the security scan report 122, the libraries 126, the override 130, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
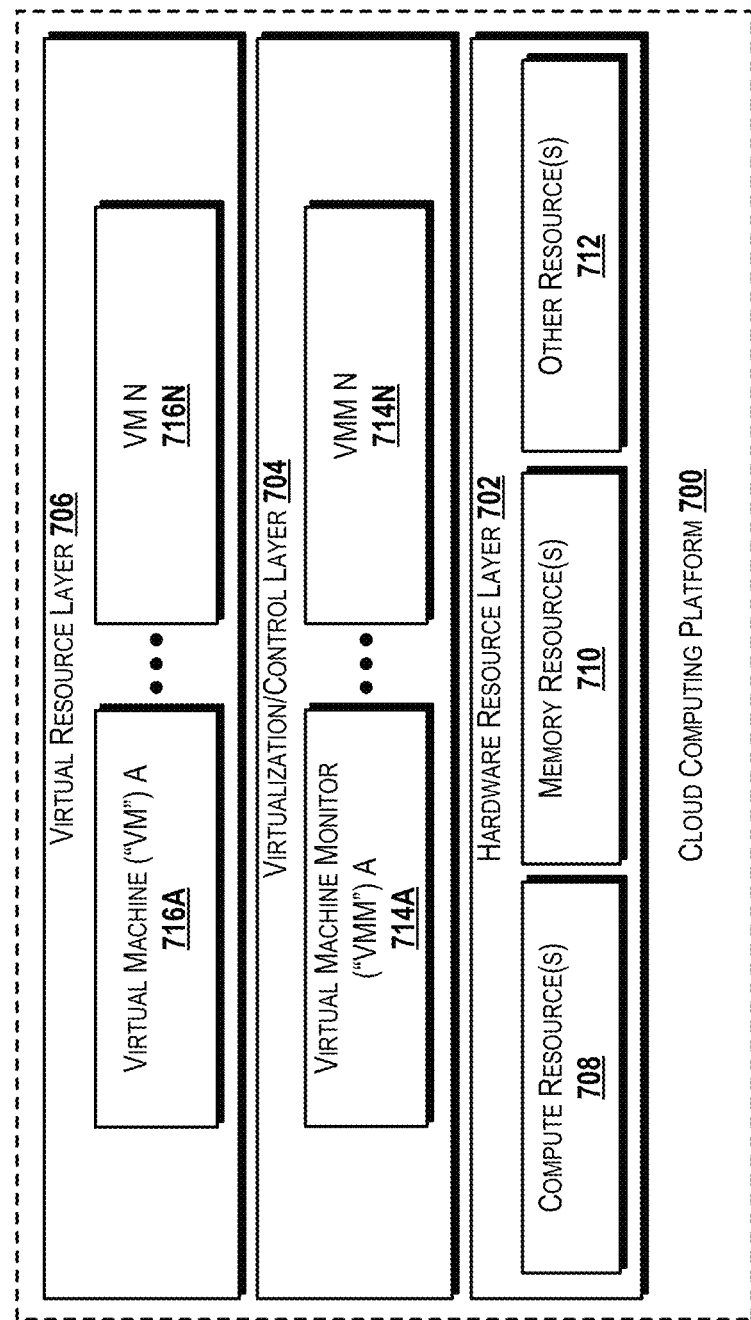
FIG. 7 is a diagram illustrating a computing environment capable of implementing aspects of the concepts and technologies disclosed herein, according to some illustrative embodiments of the concepts and technologies described herein.

FIG. 7 illustrates an illustrative architecture for a cloud computing platform 700 that can be capable of executing the software components described herein for automated software code validation and deployment and/or for interacting with the development application 108, the security scan engine 114, the deployment engine 116, the application 118, and/or the scan providers 124. Thus, it can be appreciated that in some embodiments of the concepts and technologies disclosed herein, the cloud computing platform 700 illustrated in FIG. 7 can be used to provide the functionality described herein with respect to the computing device 102, the server computer 112, the application server 120, the scan providers 124, the libraries 126, and/or the manager device 128.

The cloud computing platform 700 thus may be utilized to execute any aspects of the software components presented herein. Thus, according to various embodiments of the concepts and technologies disclosed herein, the development application 108, the security scan engine 114, the deployment engine 116, the application 118, and/or the scan providers 124 can be implemented, at least in part, on or by elements included in the cloud computing platform 700 illustrated and described herein. Those skilled in the art will appreciate that the illustrated cloud computing platform 700 is a simplification of but only one possible implementation of an illustrative cloud computing platform, and as such, the illustrated cloud computing platform 700 should not be construed as being limiting in any way.

In the illustrated embodiment, the cloud computing platform 700 can include a hardware resource layer 702, a virtualization/control layer 704, and a virtual resource layer 706. These layers and/or other layers can be configured to cooperate with each other and/or other elements of a cloud computing platform 700 to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks such as, for example, the network 104 illustrated and described hereinabove (not shown in FIG. 7). Thus, it should be understood that FIG. 7 and the following description are intended to provide a general understanding of a suitable environment in which various aspects of embodiments can be implemented, and should not be construed as being limiting in any way.

The hardware resource layer 702 can provide hardware resources. In the illustrated embodiment, the hardware resources can include one or more compute resources 708, one or more memory resources 710, and one or more other resources 712. The compute resource(s) 708 can include one or more hardware components that can perform computations to process data, and/or to execute computer-executable instructions of one or more application programs, operating systems, services, and/or other software including, but not limited to, the development application 108, the security scan engine 114, the deployment engine 116, the application 118, and/or the scan providers 124 illustrated and described herein.

According to various embodiments, the compute resources 708 can include one or more central processing units ("CPUs"). The CPUs can be configured with one or more processing cores. In some embodiments, the compute resources 708 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 708 can include one or more discrete GPUs. In some other embodiments, the compute resources 708 can include one or more CPU and/or GPU components that can be configured in accordance with a co-processing CPU/GPU computing model. Thus, it can be appreciated that in some embodiments of the compute resources 708, a sequential part of an application can execute on a CPU and a computationally-intensive part of the application can be accelerated by the GPU. It should be understood that this example is illustrative, and therefore should not be construed as being limiting in any way.

In some embodiments, the compute resources 708 also can include one or more system on a chip ("SoC") components. It should be understood that an SoC component can operate in association with one or more other components as illustrated and described herein, for example, one or more of the memory resources 710 and/or one or more of the other resources 712. In some embodiments in which an SoC component is included, the compute resources 708 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 708 can be or can include one or more hardware components arranged in accordance with an ARM architecture, available for license from ARM HOLDINGS of Cambridge, United Kingdom. Alternatively, the compute resources 708 can be or can include one or more hardware components arranged in accordance with an x86 architecture, such as an architecture available from INTEL CORPORATION of Mountain View, California, and others. Those skilled in the art will appreciate the implementation of the compute resources 708 can utilize various computation architectures and/or processing architectures. As such, the various example embodiments of the compute resources 708 as mentioned hereinabove should not be construed as being limiting in any way. Rather, implementations of embodiments of the concepts and technologies disclosed herein can be implemented using compute resources 708 having any of the particular computation architecture and/or combination of computation architectures mentioned herein as well as other architectures.

Although not separately illustrated in FIG. 7, it should be understood that the compute resources 708 illustrated and described herein can host and/or execute various services, applications, portals, and/or other functionality illustrated and described herein. Thus, the compute resources 708 can host and/or can execute the development application 108, the security scan engine 114, the deployment engine 116, the application 118, the scan providers 124, and/or other applications or services illustrated and described herein.

The memory resource(s) 710 can include one or more hardware components that can perform or provide storage operations, including temporary and/or permanent storage operations. In some embodiments, the memory resource(s) 710 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 708, subject to the definition of "computer storage media" provided above (e.g., as excluding waves and signals per se and/or communication media as defined in this application).

Although not illustrated in FIG. 7, it should be understood that the memory resources 710 can host or store the various data illustrated and described herein including, but not limited to, the software code 110, the security scan report 122, the libraries 126, and/or the override 130, and/or other data, if desired. It should be understood that this example is illustrative, and therefore should not be construed as being limiting in any way.

The other resource(s) 712 can include any other hardware resources that can be utilized by the compute resources(s) 708 and/or the memory resource(s) 710 to perform operations. The other resource(s) 712 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 702 can be virtualized by one or more virtual machine monitors ("VMMs") 714A-714N (also known as "hypervisors;" hereinafter "VMMs 714"). The VMMs 714 can operate within the virtualization/control layer 704 to manage one or more virtual resources that can reside in the virtual resource layer 706. The VMMs 714 can be or can include software, firmware, and/or hardware that alone or in combination with other software, firmware, and/or hardware, can manage one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Based on the foregoing, it should be appreciated that systems and methods for automated software code validation and deployment have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
    a server computer comprising a processor; and
    a memory that stores computer-executable instructions that, when executed by the processor, cause the processor to perform operations comprising
        obtaining, by the server computer, software code, wherein the software code is created via interactions with the server computer by a computing device,
        in response to obtaining the software code, without detecting a request to perform a security scan on the software code, and prior to receiving a request to deploy the software code, performing the security scan on the software code,
        detecting, after performing the security scan on the software code, the request to deploy the software code,
        in response to detecting the request to deploy the software code, determining if the software code includes a vulnerability that was detected during the security scan, and
        in response to a determination that the software code includes the vulnerability, terminating deployment of the software code, generating a security scan report, and outputting the security scan report to the computing device.

2. The system of claim 1, wherein the computing device executes a development application that is used to generate the software code, and wherein the software code is obtained via a portal and from the computing device.

3. The system of claim 1, wherein the vulnerability comprises a security vulnerability that exceeds a defined threshold threat level, and wherein determining that the software code does not include the vulnerability comprises determining that any vulnerabilities detected in the software code do not exceed the defined threshold threat level.

4. The system of claim 1, wherein the security scan is performed by a security scan engine and a scan provider in communication with the security scan engine.

5. The system of claim 1, wherein the computer-executable instructions, when executed by the processor, cause the processor to perform operations further comprising:
    detecting, after terminating the deployment of the software code, a change to the software code;
    in response to detecting the change to the software code and prior to receiving a further request to deploy the software code, determining that the vulnerability has been remediated;
    detecting, after determining that the vulnerability has been remediated, the request to deploy the software code; and
    deploying the software code.

6. The system of claim 1, wherein the computer-executable instructions, when executed by the processor, cause the processor to perform operations further comprising:
    providing, to a manager device, an indication that the deployment of the software code has been terminated;
    obtaining, from the manager device, an override that requests the deployment of the software code; and
    in response to obtaining the override, deploying the software code.

7. The system of claim 1, wherein deploying the software code comprises identifying an application server, triggering instantiation of the application server, and deploying the software code to the application server.

8. A method comprising:
    obtaining, by a server computer comprising a processor, software code, wherein the software code is created via interactions with the server computer by a computing device;
    in response to obtaining the software code, without detecting a request to perform a security scan on the software code, and prior to receiving a request to deploy the software code, performing, by the processor, the security scan on the software code;

detecting, by the processor and after performing the security scan on the software code, the request to deploy the software code;

in response to detecting the request to deploy the software code, determining, by the processor, if the software code includes a vulnerability that was detected during the security scan; and in response to a determination that the software code includes the vulnerability, terminating deployment of the software code, generating a security scan report, and outputting the security scan report to the computing device.

9. The method of claim 8, wherein the computing device executes a development application that is used to generate the software code, and wherein the software code is obtained via a portal and from the computing device.

10. The method of claim 8, wherein the vulnerability comprises a security vulnerability that exceeds a defined threshold threat level, and wherein determining that the software code does not include the vulnerability comprises determining that any vulnerabilities detected in the software code do not exceed the defined threshold threat level.

11. The method of claim 8, wherein the security scan is performed by a security scan engine and a scan provider in communication with the security scan engine.

12. The method of claim 8, further comprising:

detecting, after terminating the deployment of the software code, a change to the software code;

in response to detecting the change to the software code and prior to receiving a further request to deploy the software code, determining that the vulnerability has been remediated;

detecting, after determining that the vulnerability has been remediated, the request to deploy the software code; and deploying the software code.

13. The method of claim 8, further comprising:

providing, to a manager device, an indication that the deployment of the software code has been terminated;

obtaining, from the manager device, an override that requests the deployment of the software code; and in response to obtaining the override, deploying the software code.

14. The method of claim 8, wherein deploying the software code comprises identifying an application server, triggering instantiation of the application server, and developing the software code to the application server.

15. A computer storage medium having computer-executable instructions stored thereon that, when executed by a processor, cause the processor to perform operations comprising:

obtaining, by a server computer, software code, wherein the software code is created via interactions with the server computer by a computing device;

in response to obtaining the software code, without detecting a request to perform a security scan on the software code, and prior to receiving a request to deploy the software code, performing the security scan on the software code;

detecting, after performing the security scan on the software code, the request to deploy the software code;

in response to detecting the request to deploy the software code, determining if the software code includes a vulnerability that was detected during the security scan; and in response to a determination that the software code includes the vulnerability, terminating deployment of the software code, generating a security scan report, and outputting the security scan report to the computing device.

16. The computer storage medium of claim 15, wherein the vulnerability comprises a security vulnerability that exceeds a defined threshold threat level, and wherein determining that the software code does not include the vulnerability comprises determining that any vulnerabilities detected in the software code do not exceed the defined threshold threat level.

17. The computer storage medium of claim 15, wherein the security scan is performed by a security scan engine and a scan provider in communication with the security scan engine.

18. The computer storage medium of claim 15, wherein the computer-executable instructions, when executed by the processor, cause the processor to perform operations further comprising:

detecting, after terminating the deployment of the software code, a change to the software code;

in response to detecting the change to the software code and prior to receiving a further request to deploy the software code, determining that the vulnerability has been remediated;

detecting, after determining that the vulnerability has been remediated, the request to deploy the software code; and deploying the software code.

19. The computer storage medium of claim 15, wherein the computer-executable instructions, when executed by the processor, cause the processor to perform operations further comprising:

providing, to a manager device, an indication that the deployment of the software code has been terminated;

obtaining, from the manager device, an override that requests the deployment of the software code; and in response to obtaining the override, deploying the software code.

20. The computer storage medium of claim 15, wherein deploying the software code comprises identifying an application server, triggering instantiation of the application server, and deploying the software code to the application server.

* * * * *